United States Patent Office 3,528,838
Patented Sept. 15, 1970

3,528,838
COMPOSITE PIGMENT AND
PREPARATION THEREOF
Lothar H. Brixner, West Chester, Pa., assignor to E. I. du Pont de Nemours and Company, Wilmington, Del., a corporation of Delaware
No Drawing. Filed July 24, 1967, Ser. No. 655,565
Int. Cl. C09c 1/36
U.S. Cl. 106—300                                3 Claims

ABSTRACT OF THE DISCLOSURE

A composite $TiO_2$-$CaCO_3$ pigment formed by precipating $CaCO_3$ from a water soluble salt in an aqueous slurry of pigmentary $TiO_2$.

BACKGROUND OF THE INVENTION

The prior art methods used to produce $CaCO_3$ extended $TiO_2$ pigments may be grouped into three classes as follows: (1) a titanium salt solution is hydrolyzed in the presence of a slurry of the extender material; (2) a precipitated titanium oxide is blended with the extender material, and the mixture is then subjected to calcination; (3) titanium dioxide is calcined and is blended thereafter with the extender material, and the blended material may be used with or without further heat treatment.

In addition to these prior art methods there is disclosed and claimed in U.S. 2,170,800 a process by which a titanium dioxide-calcium carbonate composite pigment is prepared by digesting calcium sulfate-extended titanium dioxide pigment with an alkali metal carbonate solution to effect exchange of sulfate ions for carbonate ions. This process has not proved economically feasible, since it is first necessary to produce a composite calcium sulfate-$TiO_2$ pigment and then convert it by further reaction to the titanium dioxide-calcium carbonate composite pigment. These processes are both costly and time-consuming. The product, regardless of precautions which may be taken, will contain calcium sulfate as an impurity; and furthermore, the external form in which the calcium carbonate-titanium dioxide pigment is obtained is pseudomorphic with the original calcium sulfate, and this is not the most desirable physical form for the composite pigment.

Calcium metatitanate, such as disclosed in U.S. 2,140,236 is known, but its preparation involves calcination after deposit of the $CaCO_3$ and subsequent grinding to produce a pigmentary grade of product.

The instant invention provides an economical method for the preparation of calcium carbonate-titanium dioxide composite pigment, since the reactants used are chemicals readily available, the production of a good quality extended pigment is possible using chemicals not necessarily in their highest degree of purity, the reaction is rapid and easily controlled, no complicated equipment or high temperatures are required, and no calcination of the extended pigment is required as a step in its preparation.

SUMMARY OF THE INVENTION

In the process of this invention an aqueous solution of sodium carbonate is prepared, as is also an aqueous solution of calcium chloride. Pigmentary $TiO_2$ is dispersed in one of these solutions. The two solutions are then mixed to precipitate calcium carbonate-titanium dioxide composite pigment. In the preferred method, the titanium dioxide is slurried in the sodium carbonate solution, and the calcium chloride solution is rapidly added. When the concentrations of the sodium carbonate and calcium chloride solutions are within the preferred ranges, (i.e., one part by weight of sodium carbonate in five to seven parts by weight of water and one part by weight of calcium chloride ($CaCl_2 \cdot 2H_2O$) in one to three parts by weight of water) even with rapid agitation the precipitated product first appears as a gel, but with further addition of calcium chloride and continued agitation, the calcium carbonate-titanium dioxide composite pigment converts rapidly into a highly crystalline form. This product is easily separated from the mother liquor by filtration, and is washed and dried. The extended pigment product acts as an inseparable physical entity in settling tests in bromoform. For instance, a 30 wt. percent $TiO_2$ composite pigment with a calculated density of 3.13 grams per ml.$^{-1}$ settles quantitatively, despite the fact that the $CaCO_3$ density is only 2.71 grams per ml.$^{-1}$ compared to the density of 2.89 grams per ml.$^{-1}$ of the flotation medium, $CHBr_3$.

DEFINITIONS AND STANDARDS

In the examples which follow, the expression "S (oil)" means the scattering coefficient in m.$^2$/12 g. of a paint film under oil, prepared with a 6 mil drawdown blade. "S (dry)" indicates the scattering coefficient of the dry film. "S" as a measure of hiding power is described in Journal of the Optical Society of America, P. Kubelka, 38, 448 (1948) and D. B. Judd, "Color in Business, Science and Industry," Wiley, 1952, p. 350. The measurements reported in examples were made using a green filter, i.e., light having a wave length of 550 m$\mu$.

The titanium dioxide pigment used in each example is a commercial pigmentary grade known as "Ti-Pure R-900," produced and sold by E. I. du Pont de Nemours and Company of Wilmington, Del. Except where otherwise indicated, the calcium carbonate used as an extender in the blended comparative controls is a high purity, finely ground product commercially produced by Harry Campbell Sons, Inc. and sold as "Camel White."

The following examples are intended to illustrate the invention. They are not intended to limit it in any manner.

EXAMPLE 1

Two solutions are prepared separately as follows (1) 18.6 lbs. $Na_2CO_3$ dissolved in 11 gals. of water; (2) 26.2 lbs. of $CaCl_2 \cdot 2H_2O$ dissolved in 1½ gals. of water.

Under strong agitation, 3445 grams $TiO_2$ is dispersed in the sodium carbonate solution and the calcium chloride solution is then rapidly added, with agitation, to the sodium carbonate-$TiO_2$ slurry. A gel forms immediately, which after 1 or 2 minutes, still under rapid agitation, converts to a highly crystalline product. The crystalline precipitate is filtered from the mother liquor and dried at 120° C.

The crystalline pigmentary product is suitable for paint manufacture without grinding. In the preparation of such a paint, 5 grams of the crystalline composite pigment is placed in a ½ oz. jar containing an approximately equal volume of glass beads. Ten milliliters of alkyd flat paint vehicle is then added and the mixture is shaken on a Spex Mill for from 10 to 15 minutes. A portion of the paint so formed is poured onto a hiding-power chart (Form 09, Morest Co.) and is drawn down with a standard paint draw-down blade. The S (oil) of the paint is 3.78 compared to 2.94 for a comparative control containing the same percentage of $TiO_2$ present in the composite crystalline pigment (28.05%), extended with "Camel White" calcium carbonate.

EXAMPLE 2

Following the technique of Example 1, but varying the concentration of $TiO_2$ in the initial aqueous slurry, 8000 grams of titanium dioxide is slurried in a solution of 18.6 pounds of $Na_2CO_3$ dissolved in 11 gals. of water. A calcium chloride solution (26.2 lbs. of $CaCl_2 \cdot 2H_2O$, i.e., 19.3 lbs. $CaCl_2$, in 1½ gals. of water) is rapidly added to the slurry. A gel forms immediately which converts after one to two minutes into a white crystalline precipitate. At the conclusion of the calcium chloride solution addition, the product is filtered from the mother liquor, washed salt free and dried at 120° C. No grinding is required. A 99.4% yield (35 lbs. of composite pigment analyzing 47.4% $TiO_2$) based on calcium carbonate and $TiO_2$ is obtained. The dried pigment has a surface area of 7.6 m.²/gram, an S (dry) of 3.52 and an S (oil) of 3.25, the oiled/dry ratio being 92%. A control blended pigment of 47.4% $TiO_2$ extended with commercial $CaCO_3$ ("Pure CAL-O") has an S (dry) of 2.84 and an S (oil) of 2.41, an oiled/dry ratio of 85%.

Using the same technique as in Example 1, other calcium carbonate-$TiO_2$ pigments are prepared in which the percentage of $TiO_2$ by weight of the final pigment is varied from 15% to 75%. In these preparations, 908 grams of sodium carbonate are dissolved in five liters of water at room temperature. A separate solution is prepared using 1260 grams of calcium chloride $$(CaCl_2 \cdot 2H_2O)$$

in two liters of water again at room temperature. The titanium dioxide, in varying amounts calculated to give from 15 to 75% $TiO_2$ in the composite pigment products, is slurried in the sodium carbonate solution and the slurry stirred with rapid agitation for three minutes. The calcium chloride solution is added quickly to the $Na_2CO_3$-$TiO_2$ slurry (over a period of one to two minutes) while the rapid agitation is continued. A gel forms immediately and with continued stirring it converts into a highly crystalline precipitate in about two minutes. Agitation is continued for another five minutes, and the slurry is then filtered. The pigment product is washed and dried at about 120° C. The pigments are analyzed for $TiO_2$ content and tested. Results are shown in Table 1.

TABLE I

| Example | $TiO_2$ used (grams) | Percent $TiO_2$ on composite pigment | Light scattering values | | Oil/dry ratio (percent) |
|---|---|---|---|---|---|
| | | | S m.²/12 g. (dry) | S m.²/12 g. (oil) | |
| 3 | 175 | 15.04 | 10.5 | 4.7 | 45 |
| 4 | 200 | 15.3 | 11.8 | 5.6 | 47 |
| 5 | 225 | 19.1 | 8.2 | 4.1 | 50 |
| 6 | 255 | 20.6 | 10.5 | 4.4 | 42 |
| 7 | 314 | 24.5 | 7.4 | 3.8 | 51 |
| 8 | 348 | 26.0 | 7.7 | 3.7 | 48 |
| 9 | 382 | 28.2 | 7.6 | 3.8 | 50 |
| 10 | 420 | 28.1 | 7.7 | 3.7 | 49 |
| 11 | 460 | 32.4 | 6.0 | 3.4 | 57 |
| 12 | 1,300 | 57.3 | 2.3 | 1.8 | 78 |
| 13 | 2,000 | 66.3 | 1.5 | 1.3 | 86 |
| 14 | 3,500 | 74.7 | 1.4 | 1.2 | 86 |

In each case where the composite crystalline pigment of this example is compared with a blended comparative control, the percentage of $TiO_2$ being constant in each case, the products of the invention are found to be superior in hiding power to the blended pigments.

TECHNIQUE VARIATIONS

Although the preferred method of preparing the calcium carbonate-titania pigment of this invention is to slurry the $TiO_2$ in the sodium carbonate solution and add to this with rapid agitation the solution of calcium chloride using solutions within concentration limits such that a gel forms when the solutions are mixed, it is within the scope of the invention to slurry the titanium dioxide in water and simultaneously, with agitation, add to this the sodium-carbonate and calcium chloride solutions; or if for any reason it should be preferred, a portion of the titanium dioxide may be slurried in each of the calcium chloride and the sodium carbonate solutions and these solutions then mixed under agitation. The point of importance is that the titania should be present in pigmentary size range and in a dispersed condition when the precipitation of the calcium carbonate is effected. Reactant solutions wherein concentrations of calcium chloride and sodium carbonate are outside of the preferred concentration limits may be used, but pigments having the most outstanding properties in light scattering are prepared when a gel is formed upon mixing of the reactant solutions in the presence of dispersed titanium dioxide. Obviously, any pigmentary titanium dioxide which will disperse in water under rapid agitation may be used.

Many equivalent modifications will become apparent to those skilled in the art from a reading of the above without a departure from the inventive concept.

What is claimed is:

1. In a process for the production of a composite calcium carbonate-titanium dioxide pigment, the step of quickly mixing under rapid agitation an aqueous solution of sodium carbonate and an aqueous solution of calcium chloride, wherein in at least one of said solutions pigmentary titanium dioxide has been slurried prior to said mixing, and in which the concentration of said solution of sodium carbonate is within the limits of one part by weight $NaCO_3$ to from five to seven parts by weight of water, the concentration of said solution of calcium chloride is within the limits of one part by weight of calcium chloride as $CaCl_2 \cdot 2H_2O$ to from one to three parts by weight of water, and the titanium dioxide is present in an amount calculated to be between 10 and 80 percent by weight based on the weight of the composite calcium carbonate-titanium dioxide pigment which results from the mixing of the two solutions.

2. The process of claim 1 in which the mixing of the two said solutions results in the formation of a gel prior to the crystallization of calcium carbonate as an inseparable part of the composite calcium carbonate-titanium dioxide pigment.

3. A composite white pigment consisting of crystalline rutile, and crystalline calcium carbonate in which the rutile content is at least 15% and not greater than 75% by weight of said pigment, characterized in that the two crystalline phases in each pigment particle are in intimate and adherent contact such that the phases are not separable by physical means, and the composite pigment acts as an inseparable physical entity, the said composite pigment being uncalcined.

References Cited

UNITED STATES PATENTS

| 1,864,504 | 6/1932 | O'Brien | 106—300 XR |
| 2,138,118 | 11/1938 | Patterson | 106—300 |
| 2,170,800 | 8/1939 | Barton | 106—300 |
| 2,260,826 | 10/1941 | Booge | 106—300 |
| 2,361,986 | 11/1944 | Booge | 106—300 |

TOBIAS E. LEVOW, Primary Examiner

H. M. S. SNEED, Assistant Examiner